Patented June 15, 1926.

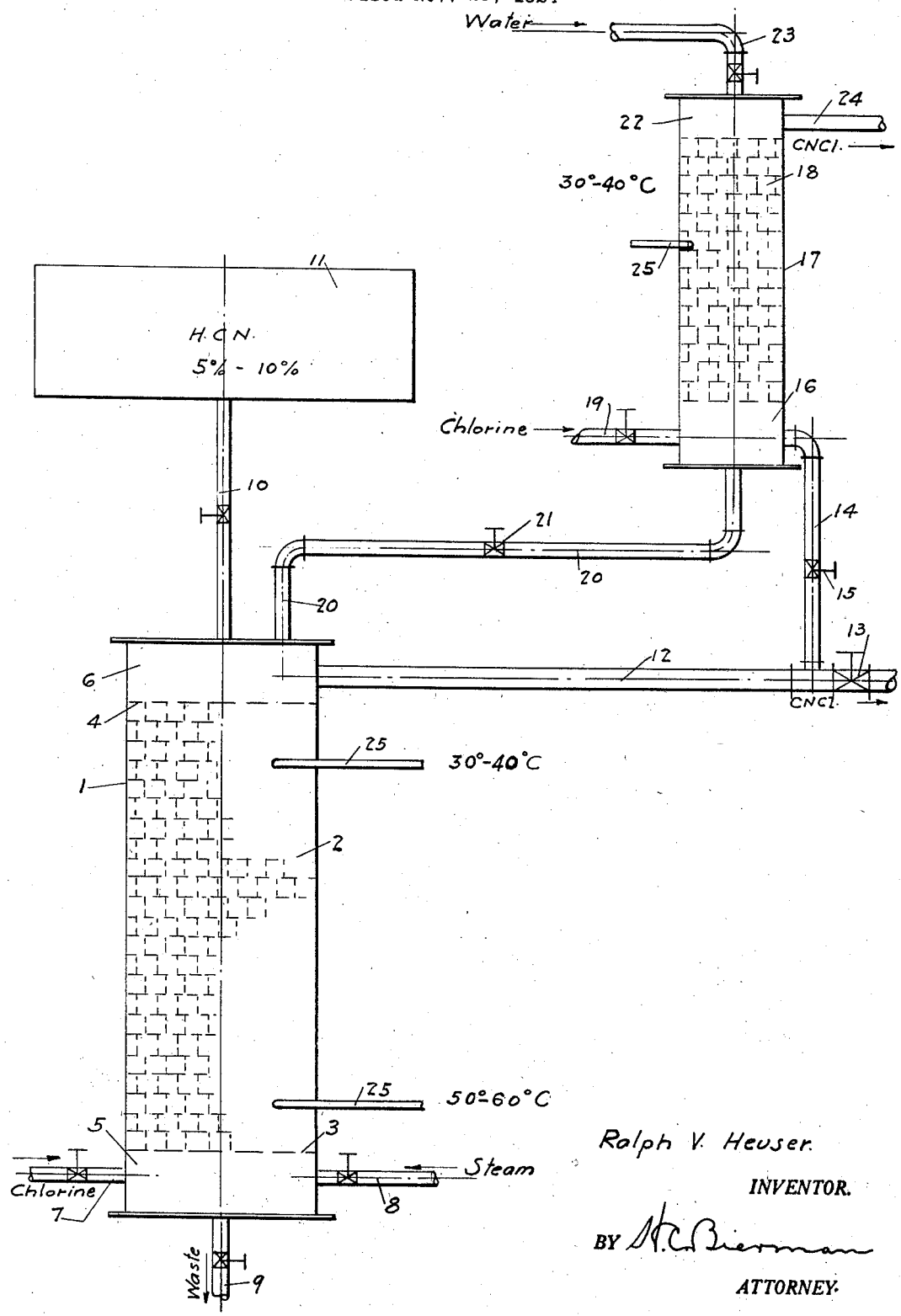

1,588,731

UNITED STATES PATENT OFFICE.

RALPH V. HEUSER, OF ELIZABETH, NEW JERSEY, ASSIGNOR TO AMERICAN CYANAMID COMPANY, OF NEW YORK, N. Y., A CORPORATION OF MAINE.

METHOD OF PREPARING CYANOGEN CHLORIDE.

Application filed November 25, 1924. Serial No. 752,162.

This invention relates to the production of cyanogen chloride and more particularly to an improved and more efficient method of making the same.

It has been well known in the art that cyanogen chloride may be produced by the action of free chlorine on hydrocyanic acid in accordance with the following equation:

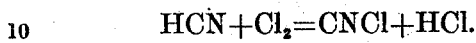

$$HCN + Cl_2 = CNCl + HCl.$$

In accordance with one of the proposed processes, gaseous chlorine was passed into a dilute aqueous solution of hydrocyanic acid. The reaction vessel was kept cool by refrigeration to prevent loss of unreacted hydrocyanic acid because of the heat of reaction evolved in the process. This procedure was very unsatisfactory for commercial operation because in spite of refrigeration, unchanged hydrocyanic acid and chlorine escaped together with some cyanogen chloride, from which they can be separated only with difficulty. Owing to the fact that comparatively dilute hydrochloric acid will cause polymerization of cyanogen chloride to form undesirable cyanuric chloride it was necessary to conduct the reaction in such dilute solution that the final concentration of the hydrochloric acid was so low as not to cause appreciable polymerization of the cyanogen chloride. After the reaction was complete the temperature of the solution was raised and the cyanogen chloride formed was distilled off. As a result only small amounts of cyanogen chloride could be produced in this manner in a comparatively great length of time with a considerable amount of equipment. Keeping the solution cool until all the hydrocyanic acid had been reacted with was disadvantageous in that the reaction is strongly exothermic involving the use of expensive refrigerating apparatus, since the temperature had to be kept below 10° C., and additional heat had to be supplied at a later stage to distill off the cyanogen chloride. The low temperatures used greatly increased the time required for chlorination.

According to another proposed process the chlorine gas was bubbled through a solution of hydrocyanic acid which was kept warm, either artificially or by the heat of the reaction, and the cyanogen chloride distilled off as it was formed. Considerable quantities of hydrocyanic acid and hydrochloric acid or some free chlorine passed over with the cyanogen chloride and the mixed gases were washed with water to remove part of the hydrocyanic and hydrochloric acids, but some cyanogen chloride was removed therewith. The mixture was then again chlorinated to convert the remainder of the hydrocyanic acid into cyanogen chloride after which the hydrochloric acid was removed by passing the vapors over marble and the excess chlorine was removed by moist copper.

This as well as the first mentioned process included a number of steps which rendered the same expensive and the yields of cyanogen chloride obtainable thereby were low, seldom exceeding 35%–70% of the theoretical based on the hydrocyanic acid used. The chief losses were occasioned by the evolution of hydrocyanic acid which escaped chlorination, and, although the hydrocyanic acid was recovered by washing the gases with water, the solution thus produced was so dilute that it could not be utilized to advantage.

Both of the above described methods were intermittent in their operation rendering quantity production thereby uneconomical.

My invention is intended to overcome the disadvantages and defects of the methods of the prior art, it being among the objects thereof to devise a method of producing cyanogen chloride which shall be efficient, simple in operation, shall not require the services of expert attendants, and which shall comprise a minimum number of steps.

It is a further object of my invention to provide a method which shall be adapted to the continuous production of cyanogen chloride in a state of high purity.

I have found that the reaction between hydrocyanic acid and chlorine gas may be conveniently effected in a column by admitting the chlorine at the bottom and allowing a dilute solution of hydrocyanic acid to enter near the top and trickle over a suitable packing material in countercurrent to the chlorine gas. The main advantage of this arrangement resides in the fact that the points of contact between chlorine and hydrocyanic acid are very numerous and that the fresh solution of hydrocyanic acid entering the column meets a gas mixture already rich in cyanogen chloride and weak in chlorine gas, whereby local overheating of the reaction products is avoided and continuity and efficiency in operation is attained.

The reaction is of an exothermic character and, barring heat losses, enough heat is liberated by the chlorination of a 10% HCN solution to raise the temperature of the reaction products by approximately 90° C. While cyanogen chloride readily polymerizes to cyanuric chloride when coming in contact with strong hydrochloric acid, this polymerization does not take place when the hydrocyanic acid subjected to chlorination is of a strength below 15% HCN. On the other hand I have made the observation that cyanogen chloride undergoes hydrolyzation in the presence of water at a relatively low temperature. The decomposition leads to the formation of ammonium chloride and carbon dioxide:

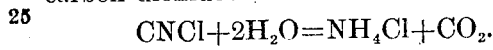

$$CNCl + 2H_2O = NH_4Cl + CO_2.$$

However, these decomposition products are generally not observed when operating the column at a temperature below 55° C. At temperatures above 60° C. the decomposition becomes appreciable and increases rapidly with an increase in temperature while the yield of cyanogen chloride falls off correspondingly. It is an essential part of my invention to obviate these losses by suitable provisions in the construction of the apparatus.

While it is feasible to withdraw the heat of reaction by cooling the column, I prefer to control the temperature either by employing initially a very weak hydrocyanic acid solution or by admitting to the column a separate, predetermined flow of cold water in connection with a higher strength of hydrocyanic acid solution. In the latter case chlorine gas may enter at the bottom, water at the top of the column and the HCN solution at a point between the two. This is especially favorable for three reasons. First, the water will cool the upper section of the column allowing the cyanogen chloride gas to pass on to the scrubbers at a relatively low temperature. Second, it tends to condense and wash down any hydrocyanic gas carried upward by the cyanogen chloride back into the reaction zone. Third, it prevents the possibility of chlorine gas reacting with any HCN gas deficient in moisture to form cyanuric chloride.

I have found that it is possible to employ for the continuous chlorination an aqueous solution of a cyanide salt such as the alkali metal cyanides or the alkali earth cyanides, in place of the free hydrocyanic acid. It is necessary in this case that the salt solution be neutral or slightly acid since the presence of free alkali leads to the formation of azulmic compounds. While the reaction is accompanied by a greater evolution of heat and whereas the spent liquor is essentially a solution of the respective metal chloride, the apparatus and the operation is in principle the same as that where free hydrocyanic acid is used as the starting material.

The highest temperature is at the lower portion of the reaction zone, the temperature decreasing to the upper portion thereof. The rates of flow of the hydrocyanic acid and of the chlorine are so proportioned that the reaction temperature at the lower end of the zone is sufficiently high to cause volatilization of unconverted hydrocyanic acid but not so high as to cause volatilization of the dilute hydrochloric acid which passes off in the waste liquid. Generally, the temperature is maintained between 25° C. and 60° C.

The upper portion of the reaction zone is maintained at a sufficiently low temperature, either by regulating the temperature or the concentration of the incoming hydrocyanic acid solution, to prevent undue volatilization of hydrocyanic acid but not so low as to cause any substantial condensation of cyanogen chloride. Under such conditions some hydrocyanic acid passes off with the cyanogen chloride and, if a very pure product is desired, the mixture is passed upwardly through a second tower or an extension of the first tower where it meets a downwardly flowing stream of water which washes out any hydrocyanic or hydrochloric acid in the gases. The wash water flows into the first tower where it joins the hydrocyanic acid solution to be acted upon by the chlorine, as set forth above. To increase the efficiency of the system I generally inject chlorine into the bottom of the second tower causing it to combine with the hydrocyanic acid carried over from the first column.

In the accompanying drawing constituting a part hereof, the single figure is a cross-sectional view of an apparatus adapted to the practice of my invention.

I provide a principal or reaction column or tower 1, the major portion of which is filled with checkerwork 2 which terminates at points 3 and 4 at the bottom and top of the tower 1, respectively, providing spaces 5 and 6, respectively. Valved inlets 7 and 8 for the introduction of chlorine and steam, respectively, communicate with space 5 and a valved outlet 9 is provided in the bottom thereof. A valved inlet 10 from tank 11 containing aqueous hydrocyanic acid opens into the top of space 6 and an outlet 12 therefrom for exit gases and vapors is provided with a valve 13. A branch pipe 14 having a valve 15 connects pipe 12 with the lower space 16 of the auxiliary or purifying column or tower 17, which is filled with checkerwork 18 in a manner similar to the checkerwork in tower 1. Valved inlet 19 allows the introduction of chlorine into space 16 and a pipe 20 provided with a valve 21 connects spaces 6 and 16. Communicating with space 22 in the upper portion of tower 17 is a valved pipe 23 leading to a supply of water at ordinary temperature and an exit pipe 24 is adapted to remove gases and vapors from the space 22. Thermometers or other temperature measuring instruments 25 are provided in the upper and lower portions of the tower 1, as well as in the upper column.

The operation of the apparatus for the production of cyanogen chloride is as follows: Assuming that all the valves are closed, the exit pipe 9 is opened and enough steam is admitted through pipe 8 to warm up the lower part of the column to a temperature approximating 50° C., after which the supply of steam is cut off. Then by opening valve 10, which is preferably supplemented by a mechanically operated constant-feed device (not shown in the drawing), hydrocyanic acid solution containing 5–6% HCN is caused to trickle over the checkerwork 2 from tank 11. Valved inlet 7 is then opened allowing chlorine to flow upwardly through the checkerwork coming into intimate contact with the hydrocyanic acid and forming cyanogen chloride with the evolution of heat. Since the major part of the reaction taken place in the lower part of the tower 1, the temperature rises, it being desirable to maintain a temperature of 50° to 60° C. at this point. The temperature gradually decreases to the upper portion of the tower 1 which may be at 12° to 18° C., the temperature of the incoming hydrocyanic acid solution, but is usually 30° to 40° C. The impure cyanogen chloride may be removed through pipe 12 and valve 13.

However, I generally prefer to purify the same and, in order to accomplish this, I start with a stronger solution of hydrocyanic acid, say 9–10%, and treat the same as described above. I then close valve 13 and open valve 15, causing the cyanogen chloride to flow into tower 17. Valved inlet 23 and valve 21 are opened allowing water to trickle over the checkerwork 18, through pipe 20 and into space 6 of tower 1 where it joins the hydrocyanic acid solution from inlet 10. The water in tower 17 removes the unconverted hydrocyanic acid from the cyanogen chloride as well as the traces of hydrochloric acid therein and conducts the same into the reaction tower 1 where the hydrocyanic acid reacts with additional chlorine and the spent liquor, which is principally dilute hydrochloric acid, flows out through exit pipe 9. The amount of water added is sufficient to reduce the strength of the hydrocyanic acid solution to about 5–6%. The resulting reaction aids in maintaining the temperature of the auxiliary or secondary tower at 30° to 40° C.

With a view to removing and utilizing small quantities of hydrocyanic acid gas carried over into the auxiliary tower 17 by the cyanogen chloride I generally inject an appropriate amount of chlorine through opening 19 converting it also to cyanogen chloride. The total amount of chlorine supplied through pipes 7 and 19 is sufficient or slightly in excess of the amount theoretically required to convert all of the available hydrocyanic acid introduced into the lower column. The purified cyanogen chloride gas collects in space 22 and issues through the exit pipe 24.

As a result I have devised a system for the operation of my new method which comprises essentially a single column or tower in which the principal reaction takes place and an auxiliary or secondary tower which may be integral with and a continuation of the principal tower, with suitable connections for the entrance and exit of fluids, and I thereby avoid the complicated apparatus necessary in practicing the proposed prior processes. The operation of the system is extremely simple and is almost entirely automatic after the proper adjustments have been made. The flow of water, aqueous hydrocyanic acid and chlorine is adjusted to the proper point and, if all the factors remain fixed, the process will proceed with comparatively little attention, the cyanogen chloride produced being removed and the spent liquor going to waste.

When, as in the preferred form of my invention, I use the auxiliary tower I obviate the necessity of close control of the temperature in the principal tower. I may operate at higher temperatures with the resulting increase in the speed of the reaction and recover in the auxiliary tower and unchanged reagents, causing them to react in the latter tower or returning them to the principal tower.

No substantial quantity of chlorine escapes from the system to contaminate the cyanogen chloride. As a result I have been able to make a product which is practically free from chlorine and hydrochloric acid and which generally contains only traces of hydrocyanic acid, whereas the cyanogen chloride produced by prior processes contained 10% or even more. If a product containing no free hydrocyanic acid is desired, it is a simple matter to so adjust the conditions of operation of the process that a slight excess of chlorine remains in the cyanogen chloride, thus assuring the absence of hydrocyanic acid. I have consistently obtained yields of cyanogen chloride in excess of 85%–90% of the theoretical, whereas in the processes of the prior art the yields seldom exceeded 70%. Furthermore, my method is continuous, does not require the services of skilled labor, does not require any complicated apparatus and it results in a high grade product without the necessity of complicated purification steps and costly apparatus therefor.

Although I have described my invention setting forth a specific embodiment thereof, my invention is not necessarily limited to the details enumerated above, since my method may be varied as will be apparent to those skilled in the art. The temperatures of the various parts of the system may be changed, the strength of the aqueous hydrocyanic acid and the temperature thereof as well as the relative amount of the incoming water may be different from the conditions set forth. The control of the flow of the ingredients may be made automatic and dependent on the temperature in the apparatus or other suitable factor. The strength of the hydrocyanic acid solution may be greater than 15% but decomposition of the cyanogen chloride to cyanuric acid may take place to some extent in the concentrated solution. The strength may be below 5%, but the use of such weak solutions greatly increases the burden on the apparatus with a corresponding decrease in the capacity of the system in producing cyanogen chloride. The temperatures in the towers may be controlled not only by changing the concentration and rate of flow of the hydrocyanic acid but also by mechanical means, such as cooling coils or other means for controlling the flow of heat. These and other changes may be made in my invention without departing from the spirit and scope thereof.

What I claim is:

1. The method of preparing cyanogen chloride which comprises continuously passing an aqueous cyanide solution downwardly countercurrent to chlorine and collecting the cyanogen chloride formed.

2. The method of preparing cyanogen chloride which comprises continuously passing a slightly acidified aqueous cyanide solution downwardly countercurrent to chlorine and collecting the cyanogen chloride formed.

3. The method of preparing cyanogen chloride which comprises continuously passing aqueous hydrocyanic acid downwardly countercurrent to chlorine and collecting the cyanogen chloride formed.

4. The method of preparing cyanogen chloride which comprises continuously passing aqueous hydrocyanic acid downwardly through a zone of progressively increasing temperature countercurrent to chlorine and collecting the syanogen chloride formed.

5. The method of preparing cyanogen chloride which comprises continuously passing aqueous hydrocyanic acid downwardly through a zone of progressively increasing temperature countercurrent to chlorine and collecting the cyanogen chloride formed, the temperature of the reaction zone being not over 60° C.

6. The method of preparing cyanogen chloride which comprises continuously passing aqueous hydrocyanic acid downwardly through a zone of progressively increasing temperature countercurrent to chlorine and collecting the cyanogen chloride formed, the temperature of the reaction zone being about 25° to 60° C.

7. The method of preparing cyanogen chloride which comprises continuously passing aqueous hydrocyanic acid downwardly countercurrent to chlorine and collecting the cyanogen chloride formed, the relative rates of flow of the reacting substances being so adjusted that the principal reaction takes place in the lower portion of the zone of contact of said substances.

8. The method of preparing cyanogen chloride which comprises continuously passing aqueous hydrocyanic acid downwardly countercurrent to chlorine, removing the gaseous products of reaction and scrubbing the same to purify the cyanogen chloride formed.

9. The method of preparing cyanogen chloride which comprises continuously passing aqueous hydrocyanic acid downwardly countercurrent to chlorine, removing the gaseous products of reaction and passing the same through a current of water.

10. The method of preparing cyanogen chloride which comprises continuously passing aqueous hydrocyanic acid downwardly countercurrent to chlorine, removing the gaseous products of reaction, passing the same through a current of water and adding said water to the aqueous hydrocyanic acid.

11. The method of preparing cyanogen chloride which comprises continuously passing equeous hydrocyanic acid downwardly countercurrent to chlorine, removing the gaseous products of reaction and passing the same through a current of water together with additional chlorine.

12. The method of preparing cyanogen chloride which comprises continuously passing aqueous hydrocyanic acid downwardly countercurrent to chlorine, removing the gaseous products of reaction, passing the same through a current of water together with additional chlorine and adding said water to the aqueous hydrocyanic acid.

13. The method of preparing cyanogen chloride which comprises continuously passing aqueous hydrocyanic acid downwardly through a zone of progressively increasing temperature countercurrent to chlorine, collecting the cyanogen chloride formed and maintaining a temperature in the lower end of the reaction zone sufficiently high to vaporize any unconverted hydrocyanic acid.

14. The method of preparing cyanogen chloride which comprises continuously passing aqueous hydrocyanic acid downwardly through a zone of progressively increasing temperature countercurrent to chlorine, collecting the cyanogen chloride formed and maintaining a temperature in the upper end of the reaction zone sufficiently low to prevent undue volatilization of hydrocyanic acid but not so low as to cause condensation of cyanogen chloride.

15. The method of preparing cyanogen chloride which comprises continuously passing aqueous hydrocyanic acid downwardly countercurrent to chlorine, removing the gaseous products of reaction, passing the same through a current of water together with additional chlorine, adding said water to the aqueous hydrocyanic acid and maintaining a temperature of 25° to 60° C. in the lower part of the principal reaction zone and a temperature of 25° to 40° C. in the upper part thereof.

16. The method of preparing cyanogen chloride which comprises continuously passing aqueous hydrocyanic acid containing about 5%–6% HCN downwardly countercurrent to chlorine and collecting the cyanogen chloride formed.

17. The method of preparing cyanogen chloride which comprises continuously passing aqueous hydrocyanic acid containing about 9%–10% HCN downwardly countercurrent to chlorine, removing the gaseous products of reaction and passing the same through a current of water and adding said water to the aqueous hydrocyanic acid, the amount thereof being sufficient to reduce the strength of the hydrocyanic acid solution to 5%–6%.

18. The method of preparing cyanogen chloride which comprises continuously passing aqueous hydrocyanic acid containing about 9%–10% HCN downwardly countercurrent to chlorine, removing the gaseous products of reaction, passing the same through a current of water and adding said water to the aqueous hydrocyanic acid, the amount thereof being sufficient to reduce the strength of the hydrocyanic acid solution to 5%–6%, and maintaining a temperature of 25° to 60° C. in the lower part of the principal reaction zone and a temperature of 25° to 40° C. in the upper part thereof.

19. The method of preparing cyanogen chloride which comprises continuously passing aqueous hydrocyanic acid containing about 9%–10% HCN downwardly countercurrent to chlorine, removing the gaseous products of reaction, passing the same through a current of water and adding said water to the aqueous hydrocyanic acid, the amount thereof being sufficient to reduce the strength of the hydrocyanic acid solution to 5%–6%, and maintaining a temperature of 55° to 60° C. in the lower part of the principal reaction zone and a temperature of 30° to 40° C. in the upper part thereof.

20. The method of preparing cyanogen chloride which comprises continuously passing aqueous hydrocyanic acid containing about 9%–10% HCN downwardly countercurrent to chlorine, removing the gaseous products of reaction, passing the same through a current of water with additional chlorine, and adding said water to the aqueous hydrocyanic acid, the amount thereof being sufficient to reduce the strength of the hydrocyanic acid solution to 5%–6%, and maintaining a temperature of 55° to 60° C. in the lower part of the principal reaction zone and a temperature of 30° to 40° C. in the upper part thereof.

In testimony whereof, I have hereunto subscribed my name this 13th day of November, 1924.

RALPH V. HEUSER.